Oct. 3, 1950 E. E. MASTERSON 2,524,063

MAGNETIC RECORDING-REPRODUCING TRANSDUCER

Filed Nov. 30, 1948

INVENTOR
EARL E. MASTERSON
BY Morris A. Rabkin
ATTORNEY

Patented Oct. 3, 1950

2,524,063

UNITED STATES PATENT OFFICE 2,524,063

MAGNETIC RECORDING-REPRODUCING TRANSDUCER

Earl E. Masterson, Palmyra, N. J., assignor to Radio Corporation of America, a corporation of Delaware Application November 30, 1948, Serial No. 62,754

8 Claims. (Cl. 179—100.2)

This invention relates to magnetic sound-recording and reproducing systems and has special reference to the provision of improvements in systems designed to handle plural-track tape records.

The transducer or "magnetic applicators" employed in present day magnetic phonographs for recording, reproducing and erasing purposes usually comprise two stacks of C-shape laminations assembled in the form of a ring; the thickness of the stacks and hence of the ring being adjusted to correspond to the width of the sound track which the applicator is designed to serve. Although ring-type applicators of the type described contain two "air-gaps," only one of the gaps can be used and it is therefore necessary, when using this type of applicator in conjunction with dual-track records, to employ either (*a*) two erasing applicators and a movable recording-reproducing applicator or (*b*) two recording-reproducing applicators and a movable erasing applicator. In any case all dual-track magnetic phonographs designed for both recording and reproducing have heretofore necessarily employed three or more magnetic applicators.

The principal object of the present invention is to provide a magnetic phonograph wherein but two (instead of three) magnetic-applicators are required for recording, reproducing and erasing a dual-track record.

A related object of the invention is to provide a "double-ended" magnetic applicator wherein the polar portions are constructed and arranged to service separate ones of the sound-tracks of a dual track record.

The foregoing objects are achieved in accordance with the invention by the provision of a magnetic applicator comprising a bi-part laminated magnetic structure having a pair of confronting pole portions at one end and another pair of confronting polar portions at its other end; the polar portions at one end being offset from the polar portions at the other end a distance corresponding substantially to one half the width dimension of the record and by so mounting the applicator that each of its two pairs of polar portions is always in line with the particular sound-track that it is designed to serve.

Certain preferred details of construction together with other objects and advantages will be apparent and the invention itself will be best understood by reference to the following specification and to the accompanying drawing, wherein.

Figures 1, 2, 3, 4, 5:
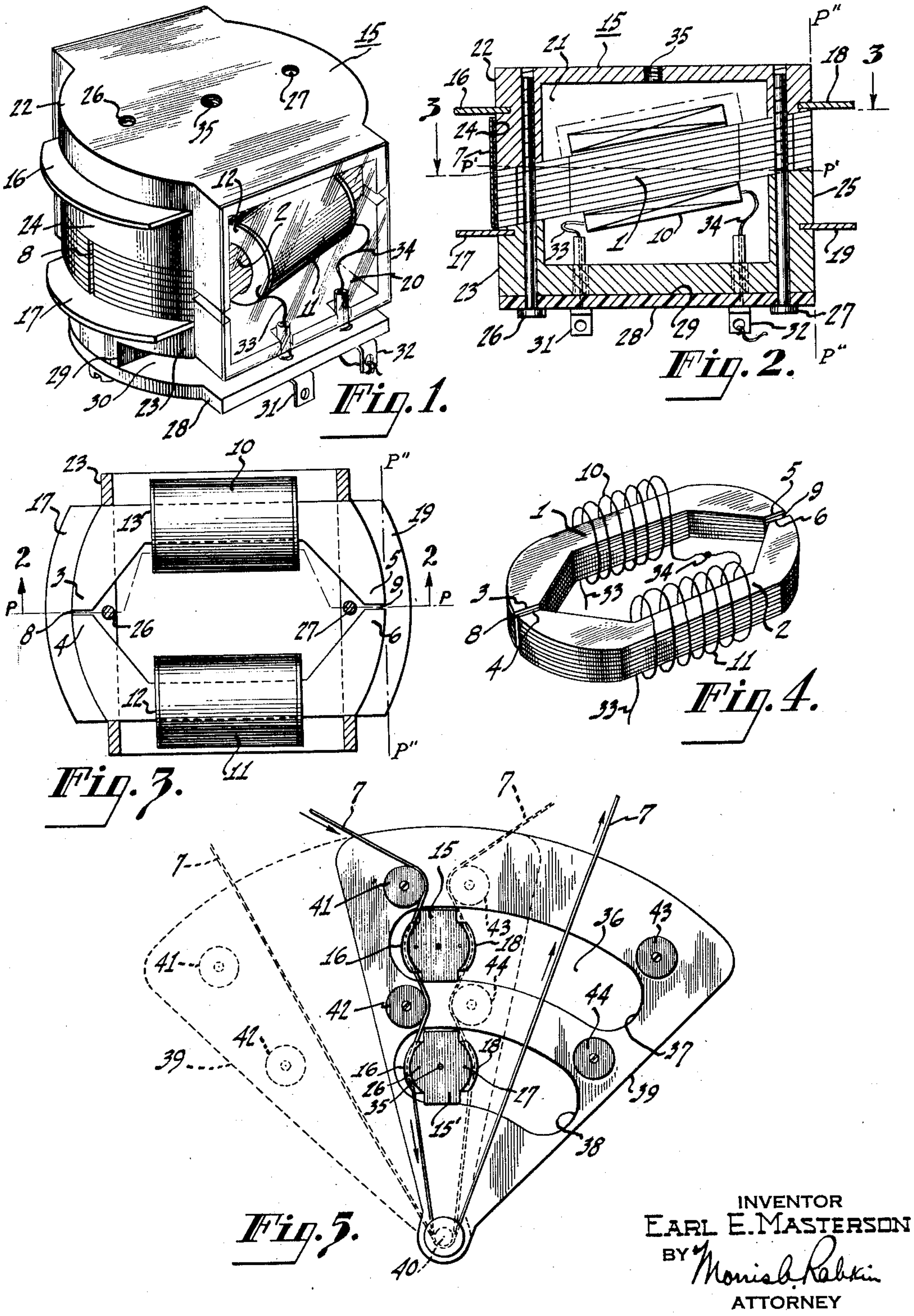
Fig. 1 is a view in perspective of a double-ended magnetic applicator constructed in accordance with the principle of the invention for servicing a dual track tape-like record.
Fig. 2 is a section taken on the line 2—2 of Fig. 3.
Fig. 3 is a section taken on the line 3—3 of Fig. 2.

Fig. 4 is a view in perspective of the bi-part magnetic core member of the applicator and Fig. 5 is an elevational view of a reeling system for a dual-track magnetic tape record showing one manner in which the magnetic-applicator of the invention may be presented to separate sound tracks on a flexible tape-like record. The specific form of the reeling system herein shown is claimed in the copending application of Earl E. Masterson and Noel Urquhart, Serial No. 84,634, filed March 31, 1949.

The drawing shows a bi-part laminated magnetic-core structure comprising two C-shape pieces 1 and 2, arranged in juxtaposition, the laminations in each piece being cut and stacked at an angle (as more clearly shown in Fig. 2), so that the confronting polar faces 3 and 4 at one end of the structure are offset (in a vertical direction as viewed in Figure 2) from the confronting polar faces 5 and 6 at the other end a distance corresponding approximately to the common thickness dimension of the two pieces. After the laminations are stacked at an angle, the outer extremities of the core structure adjacent to the polar faces are dressed to provide smooth, tape contacting surfaces. Stated more specifically, the discrete polar faces 3 and 4 or 5 and 6, which define oppositely located non-magnetic gaps 8 and 9, respectively, in the structure, are disposed on opposite sides of, and parallel to, a first reference plane P—P (Figure 3), and the respective tape contacting surfaces are disposed, in accordance with the present invention, on opposite sides of a second reference plane P′—P′ (Figure 2) drawn through the core structure 1—2 normal to the first reference plane and to a third reference plane P″—P″ (Figures 2 and 3) which is normal to the first reference plane P—P and tangent to either of the tape contacting surfaces at the gap therein.

In order to reduce the possibility of cross-talk between the sound tracks the thickness dimension of the magnetic core should preferably be very slightly less than one-half the width of the plural-track tape-like record 7 (Figs. 2 and 5) which the applicator is designed to serve. Thus, in one practical embodiment of the invention wherein the tape record was .250 of an inch wide, the core was constituted of ten mu metal laminations each .010″ thick; hence the overall thickness of the core was approximately .025″ less than one-half the width of the tape. This permitted the use of a clearance (unmagnetized) space of .030″ along the center of the tape between the two sound tracks and a clearance space of .010″ between the outer edge of each track and the adjacent edge of the tape.

As shown more clearly in Figs. 4 and 1, the outer or tape contacting surfaces of the core structure 1—2 adjacent to its separate pairs of polar faces 3—4, 5—6 are preferably made at least slightly convex so that the tape record 7 (Figs. 2 and 5) may be subject to tension in passing over the non-magnetic gaps 8 and 9 between the said pairs of polar faces. As in standard practice the field coils 10 and 11 for the magnetic core may be wound on separate coil forms 12, 13 (Figs. 1 and 3) on the mid-sections of the C-shape parts 1 and 2 of the core.

The bi-part magnetic core of the applicator, and its field coils 10 and 11, are preferably mounted in a casing or housing 15 which is provided on each of its opposite ends with a pair of outstanding flanges 16—17, 18—19 for guiding the record tape 7 past the separate air gaps 8 and 9. In the instant case the housing for the core and its coils comprises a pair of mica side walls 20, 21 and "upper" and "lower" body parts 22 and 23 (Fig. 1) constituted of aluminum or other light weight non-magnetic material. These parts 22 and 23 have diametrically opposed convex end-wall portions 24 and 25 which lie flush with the convex tape contacting surfaces of the ends of the magnetic core adjacent to the polar faces 3—4, 5—6. Each of the convex wall portions 24, 25 occupies that half of the space between the guide members 16—17, 18—19 which is allotted to the sound track that is served by the opposite pair of pole faces. The opposed lateral surfaces of the dependent end walls 24—25 of the housing 15, have the same angle of tilt as the magnetic core 1—2 and the core is clamped therebetween by non-magnetic screws 26 and 27 which extend through the hollow inner portion of the core. These screws 26—27 also serve to secure an insulating terminal board 28 to a central rib 29 on the outer surface of the "lower" part 23 of the housing. The terminal board or socket 28 is preferably of the same shape and dimensions as the bottom of the casing and the presence of a space 30 between the socket 28 and the said bottom surface obviates the possibility of a short circuit between the casing and the inner terminals of the lugs 31 and 32 to which external connections are made to the leads 33—34 of the coils 10 and 11. A screw hole or other aperture 35 is provided at the center of the casing 15 for attaching the unit to a mounting plate 36 (Fig. 5).

Fig. 5 shows how two magnetic applicators 15—15′, constructed in accordance with the invention, may serve as the erasing, recording and reproducing "heads" for both sound tracks of a plural-track record 7. Here the applicators which are immovably mounted in line with each other on the back plate 36, project through separate arcuate apertures 37 and 38 in a pivotally mounted front plate 39. There is a capstan or driving pulley 40 for the tape mounted adjacent to the pivot of the plate 39 and two pairs of guide rollers 41—42, 43—44 mounted in spaced apart relation on different radii of the said plate adjacent to the opposite ends of the slots 37 and 38 through which the magnetic applicators 15 and 15′ project. The rollers 41—42 (or 43—44) and the capstan 40 define a path in the form of an open loop around which the record 7 travels with its magnetizable surface presented to the interior of the loop. Thus, when the pivoted front plate 39 is swung to the right, as it is shown in Fig. 5, the guide rollers 41 and 42 urge the tape into contact with the left end of each of the applicators 15 and 15′, and the tape 7 is drawn by the capstan 40 over the gap between the polar faces at that end of the applicators. Conversely, when the plate 39 is swung to the left the tape is moved out of contact with the left ends of the applicators and is urged by the other pair of rollers 43 and 44 into contact with the convex ends on the right side of the applicators. Since, as previously set forth, the opposite ends of the applicators are offset from each other, they serve different longitudinal halves of the magnetizable surface of the tape. In the instant case, the left end of the first applicator 15 serves as the erasing "head" for one of the sound tracks when the tape is driven in the forward direction and its other end serves as the erasing "head" for the other track when the tape is driven in the opposite direction. Similarly, the left end of the second applicator 15′ serves as a combined recording and reproducing "head" for the first mentioned track when the tape is running "forward" and its other end serves as the recording and reproducing head for the other track when the tape is running in the reverse direction.

From the foregoing it will be apparent that two of the double ended magnetic applicators of the present invention will do the work of three prior art applicators. Furthermore, it will be apparent that the present invention (*a*) simplifies hum-balancing problems, since one applicator is used for both tracks (*b*) simplifies the associated amplifiers since no switch is required to change the circuit from one track to the other (*c*) because the same coils are used for both tracks, the sensitivity or "response" of the two tracks is the same and (*d*) the life of the applicators is doubled because of its dual wearing-surfaces.

What is claimed is:

1. A magnetic applicator for a flexible magnetic record comprising a casing having a pair of oppositely located, outwardly convex end walls constituted of non-magnetic material upon which the record may travel and having diametrically opposite openings disposed on opposite sides of a median plane drawn through said convex end walls, and a laminated magnetic structure mounted within said casing and having a pair of confronting convex pole portions presented to said diametrically opposite openings and forming a continuation of the convex end walls of said casing.

2. The invention as set forth in claim 1 and wherein each of said non-magnetic end walls of said casing are provided with a pair of spaced apart guide members between which said flexible record travels in its journey over said diametrically opposite pairs of magnetic pole pieces.

3. A transducer comprising a magnetic structure having oppositely located polar end portions, each of said end portions having a non-magnetic gap therein, the boundaries of each of said gaps being defined by a pair of confronting pole faces, the outer extremities of said end portions adjacent to said gaps constituting oppositely disposed tape contacting surfaces, the confronting faces of each pair being disposed on opposite sides of a common reference plane through both of said gaps, substantially all of one of said tape contacting surfaces being disposed on one side of a second reference plane normal to said first-mentioned plane and the other of said tape contacting surfaces being disposed on the opposite side of said second reference plane, said first and second reference planes being mutually normal to a third reference plane which is tangent to either of said tape contacting surfaces at the gap therein.

4. A transducer for servicing the separate magnetic sound-tracks of a dual-track record of the type whereon said magnetic tracks are disposed in spaced apart relationship on opposite sides of the central longitudinal axis of a tape-like base, said transducer comprising a magnetic structure having a pair of oppositely located end portions, said structure having a first non-magnetic gap in one of said end portions, the boundaries of said first gap being defined by a first pair of confronting pole faces which terminate said magnetic structure at the end adjacent to said first gap, said structure having a second non-magnetic gap in the other of said end portions, the boundaries of said second gap being defined by a second pair of confronting pole faces which terminate the magnetic structure at the end adjacent to said second gap, the outer extremities of said end portions adjacent to said gaps constituting oppositely disposed tape contacting surfaces, all of said pole faces lying substantially parallel to a reference plane which lies through both of said gaps, substantially all of one of said tape contacting surfaces being disposed on one side of a second reference plane normal to said first mentioned plane and the other of said tape contacting surfaces being disposed on the opposite side of said second reference plane, said first and second reference planes being mutually normal to a third reference plane which is tangent to either of said tape contacting surfaces at the gap therein.

5. The invention as set forth in claim 4 and wherein the thickness dimension of said magnetic structure as measured along the tape contacting surfaces is less than one-half the width dimension of said tape-like base of said dual-track record.

6. The invention as set forth in claim 5 and wherein said thickness dimension corresponds substantially to the width dimension of one of the magnetic sound-tracks on the dual-track record which said transducer is designed to serve.

7. The invention as set forth in claim 4 and wherein a pair of parallelly arranged flanges are mounted adjacent to each of said ends of said magnetic structure for guiding said tape-like record past said non-magnetic gaps along a path normal to said outer edges of said polar faces.

8. The invention as set forth in claim 4 and wherein said second reference plane extends along said central longitudinal axis of said record when said record is in its said path between said parallelly arranged flanges.

EARL E. MASTERSON.

REFERENCES CITED

The following references are of record in the file of this patent:

FOREIGN PATENTS

| Number | Country | Date |
|---|---|---|
| 622,623 | Germany | Dec. 2, 1935 |
| 725,830 | Germany | Sept. 30, 1942 |